June 14, 1960           J. UHING           2,940,322
ROTARY TRANSLATORY MOTION DRIVE GEAR
Filed April 19, 1956           5 Sheets-Sheet 1
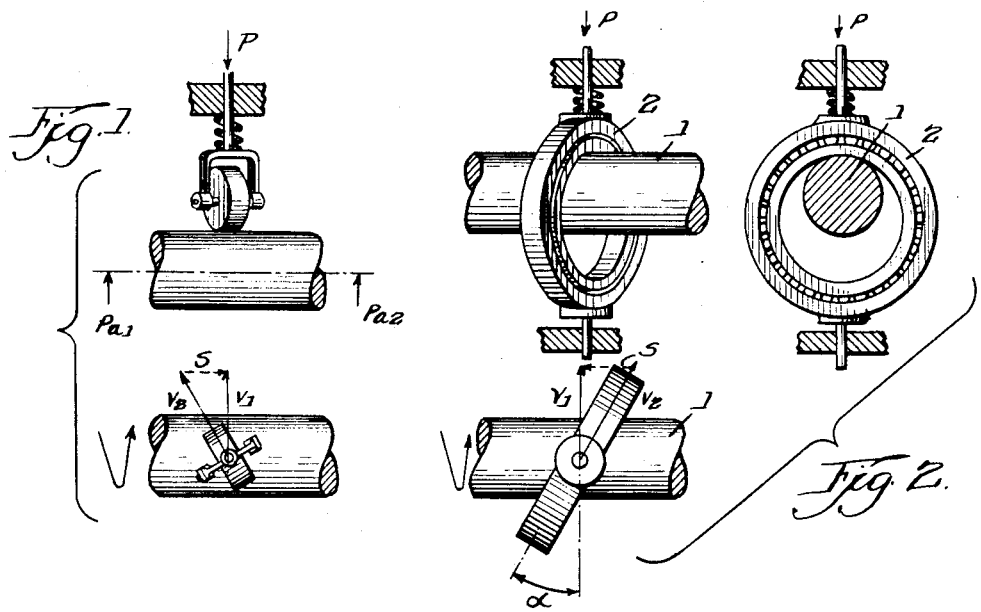
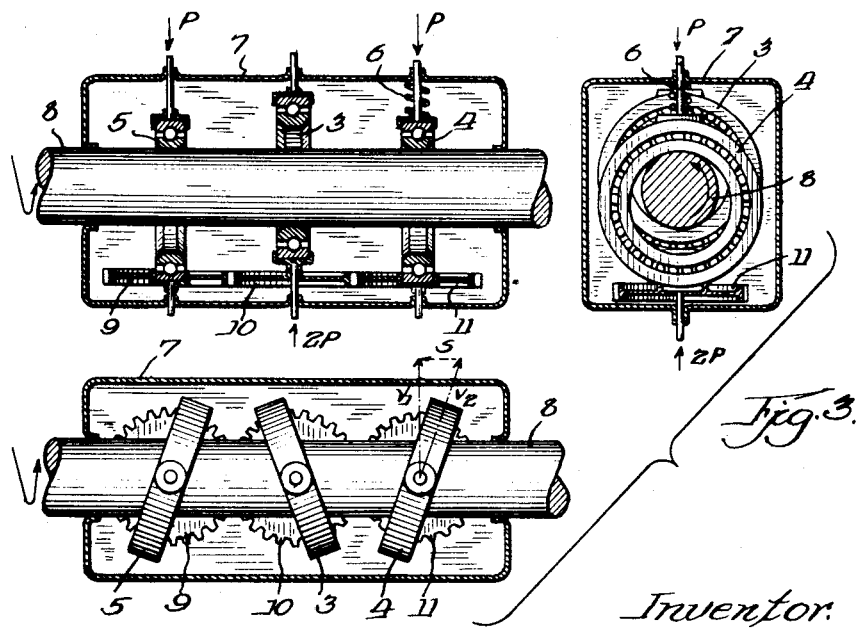
Inventor.
Joachim Uhing.
By
Atty.

June 14, 1960  J. UHING  2,940,322
ROTARY TRANSLATORY MOTION DRIVE GEAR
Filed April 19, 1956  5 Sheets-Sheet 2

Inventor:
Joachim Uhing.
By
Atty.

Inventor:
Joachim Uhing.

June 14, 1960            J. UHING            2,940,322
ROTARY TRANSLATORY MOTION DRIVE GEAR
Filed April 19, 1956            5 Sheets-Sheet 4
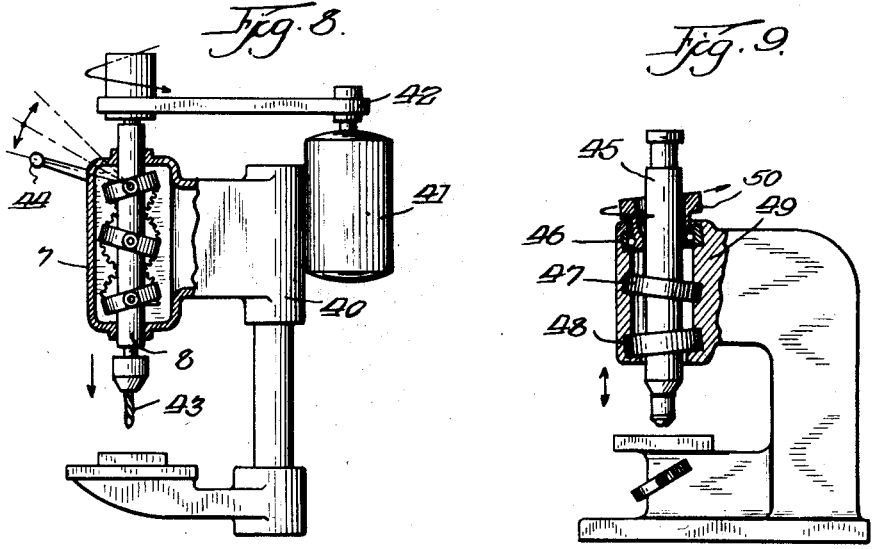
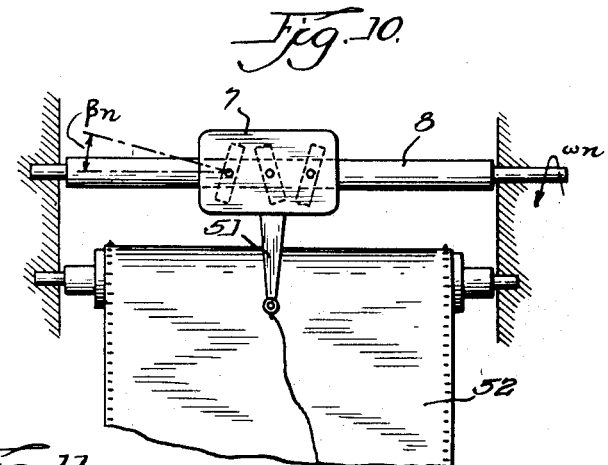
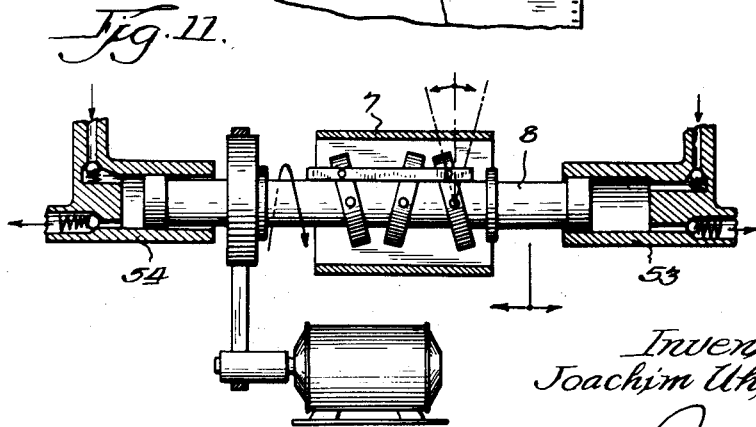
Inventor:
Joachim Uhing.

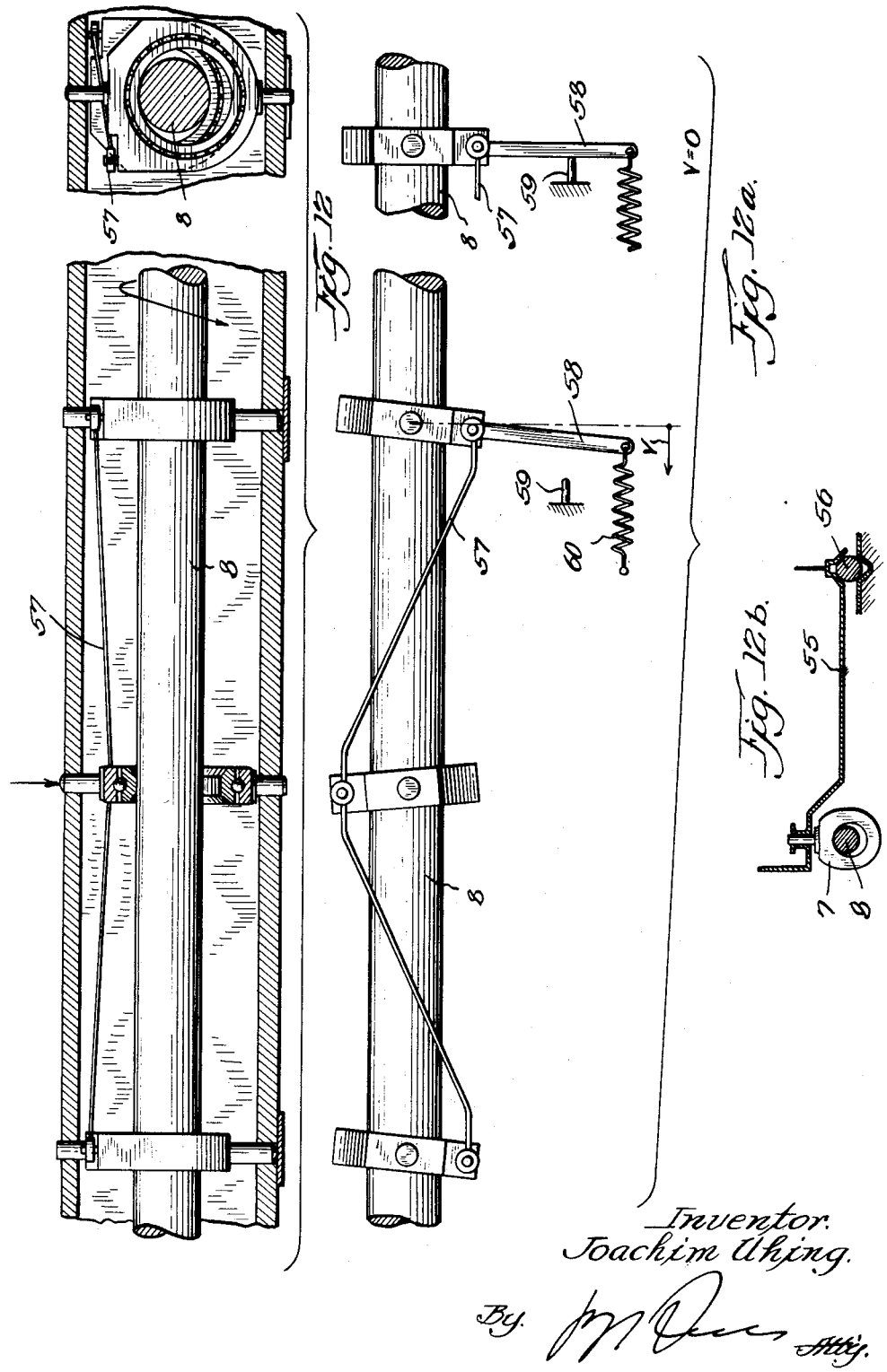

United States Patent Office 2,940,322
Patented June 14, 1960

2,940,322

ROTARY TRANSLATORY MOTION DRIVE GEAR

Joachim Uhing, Dorfstede 23, Kiel-Schulensee, Germany

Filed Apr. 19, 1956, Ser. No. 579,407

23 Claims. (Cl. 74—22)

This invention is concerned with a drive gear for effecting translatory motion of machine parts.

Known rotary drive gears for effecting translatory motion of machine parts comprise a rotatable shaft and at least one rotatably journalled member in frictional engagement therewith. In prior gears of this kind, at least one roller constituted the rotary member for transmitting to a shaft, depending upon its position relative to the shaft, a motion component of different magnitude and in some instances of different direction of motion. While gears of this kind have been known for a long time, they have until now been rarely used because they require great expenditures regarding technical means if it is desired to obtain thrusts of some magnitude.

The various objects and features of the invention will appear from the description which will be rendered below with reference to the accompanying drawings showing in schematic manner a known device and in similarly schematic manner embodiments of the invention to give examples. In the drawings:

Fig. 1 shows a known gear device in perspective and top elevational view, respectively;

Fig. 2 indicates respectively in perspective, top elevational and sectional view, the scheme of construction of a rotary drive gear according to the invention;

Fig. 3 illustrates respectively in longitudinal, transverse sectional and top elevational views an embodiment of the invention comprising three ringlike rotation members;

Figure 7:
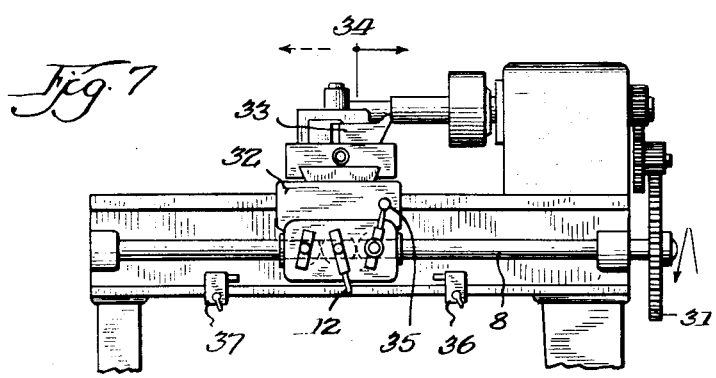

Fig. 7 indicates as an example of using the invention a portion of a lathe and particularly the drive for the carrier thereof;

Fig. 8 shows the use of the invention in connection with a drill press;

Fig. 9 illustrates the invention as applied to a microscope;

Fig. 10 is an example of the use of the invention in connection with a recording device;

Fig. 11 shows the invention as applied to a piston drive;

Fig. 12 and 12a indicate the use of the invention for driving the carriage of an office machine; and Fig. 12b indicates a typewriter carriage in schematic cross-sectional view.

Referring now to Fig. 1, showing a known drive gear, there is provided a shaft, and a roller journalled in a fork which is pressed against the shaft by a spiral spring. The applied pressure P is counteracted by the shaft bearings producing pressures acting in the directions P$a$1 and P$a$2. The forces transmitted between the roller and the shaft are very small. A further disadvantage is that means must be provided to prevent slipping off of the roller from the shaft. Attempts have been made to raise the efficiency of the gear by arranging several rollers angularly displaced relative to the shaft. Bearing loads or pressures are thereby avoided and the shift thrust force is increased. However, pressure of relatively great magnitude cannot be applied because the rollers are in point engagement with the shaft inasmuch as the roller axes must extend at an angle to the shaft axis so as to obtain an axially effective shift thrust component. Another drawback resides in the relatively great height of the arrangement.

The invention avoids the above-indicated disadvantages by the provision of a rotation member made in the form of a ring which embraces the shaft in frictional engagement therewith, angularly inclinable bearing means being provided for rotatably journalling said ring, the inner diameter of said ring exceeding the diameter of said shaft, and the axis of said ring being eccentrically disposed relative to the axis of the shaft so that the ring engages the shaft only along a defined area thereof. The structure provides the advantage of producing a linear engagement between the ring and the shaft and therewith as compared with the pointlike engagement of the prior device, considerably increasing the forces transmitted.

In accordance with a further object and feature of the invention, the device may be modified by the provision of a hollow shaft containing a rotation member made in the form of a roller having a diameter smaller than the inner diameter of the shaft and being in frictional engagement therewith.

The thought which is common to the two basic embodiments resides in the provision of a structure wherein one rotating part embraces another rotating part in frictional linear engagement therewith and avoiding disengagement of the parts.

In accordance with another feature, the glide surfaces of the ring embracing a shaft or of the roller means disposed inside of a hollow shaft, may be arcuate in form.

Referring now to Fig. 2, numeral 1 indicates a driven shaft and numeral 2 casing or journal member embracing the shaft. The casing member 2 is angularly tiltably journalled and contains a ringlike member which is rotatable therein in a ball bearing as shown in the sectional view. A spiral spring is provided for pressing the casing member 2 in radial direction, thereby pressing the inner ring against the shaft 1 with a force P. The pressure transmitted to the shaft is due to the relatively large contacting surface between the corresponding parts considerably greater than in the structure according to Fig. 1. The inner ring is in addition always in stable equilibrium relative to the shaft and sliding off is thus prevented.

The operation effecting the transmission of force is apparent from the top elevational view at the bottom of Fig. 2. With the rotation axis of the rotatable inner ring disposed at angle to the shaft axis, there will result as a consequence of the speed of rotation $V_1$ of the shaft and the speed of rotation $V_2$ of the ring, a shift thrust component S acting between the shaft and the ring and extending axially of the shaft. The casing to and therewith the rotatable inner ring may be relatively fixedly disposed as shown in Fig. 2 to shift the shaft axially, or the shaft may be disposed axially fixed and the ring with its journal casing may be axially movable, and in the latter case, the ring with its journal means will be moved axially of the shaft.

The axial shift thrust speed depends upon three factors, namely, first, the speed of rotation of the shaft; second, the speed of rotation of the ring; and third, the angle of the ring relative to the shaft axis. A change in any of these three factors will affect the magnitude and direction of the shift speed. The invention contemplates to use for the alteration of the shifting preferably alteration of the tilting angle α.

The efficiency of the drive gear will be considerably increased by the use of a plurality of rings. A particularly suitable example comprising three rings is shown in Fig. 3. The three rings 3, 4, 5 are arranged so that they engage the shaft 8 along two diametric circumferential lines at mutually symmetric points. A spring 6 produces a pressure in the direction P which is distributed to the entire casing 7 and acts between the shaft 8 and the ring 5 likewise as pressure P, while twice the pressure 2P is produced between the ring 3 and the shaft 8. The total pressure between the ring system and the shaft is accordingly 4P and the axial shift thrust force is correspondingly four times greater than with one ring.

The rings are as shown journalled in ball bearings. However, other bearings may be used, for example, roller bearings securing easy rotation of the rings without sliding relative to the shaft.

As illustrated in the bottom view of Fig. 3, the two outermost rings which engage the shaft 8 from above, must be set angularly in identical sense while the inner ring must be angularly set in opposite sense, so that the shift thrust forces of the three rings become additive. The requirement may be met by suitable means for setting the journals or bearings of the three rings in common. In accordance with the illustrated embodiment the setting is effected by three gear wheels 9, 10, and 11 which are in mesh. However, other means may be used, for example, suitable lever-like link means.

Figure 4:
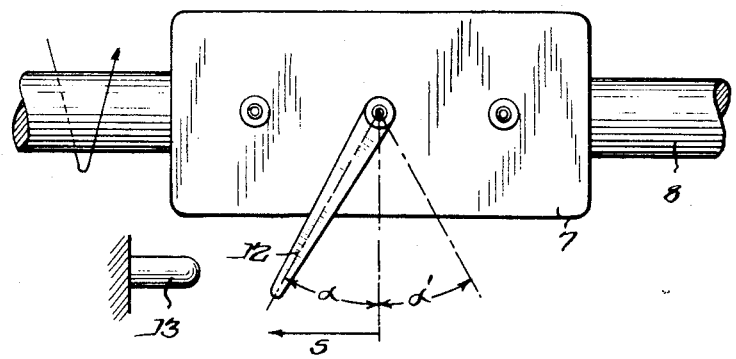
Fig. 4 is a top elevational view of a casing for the drive gear according to Fig. 3 and automatic adjustment means for the translatory motion to be effected.

Fig. 4 shows an embodiment of the invention operating as a follower or tracer device. The figure shows a top elevational view of the casing 7 indicated in Fig. 3. At the tilting axis of the central ring 3 (Fig. 3) there is provided a lever 12, outside the casing, for angularly setting the rings 3, 4, 5 in common. When the lever 12 is set to the angle α, the casing 7 will be moved in the direction of the arrow S until the lever reaches a stop 13 which resets the lever gradually to α=0, causing stopping of the casing. If the lever is arranged for always contacting the stop 13, the casing will follow the stop responsive to changing the position thereof.

The drive device according to the invention, as described with reference to Fig. 4, produces following of the casing or of a machine part moved by the casing.

The embodiment schematically shown in Fig. 4 may be modified in several ways. For example, the lever 12 may be actuated by hand instead of by a stop; the arrangement will then act as a force amplifier. Another possibility comprises a lever moving responsive to motion of the casing along a templet, thus controlling the speed of the casing motion depending upon the corresponding executed path. The templet may if desired be movable or variable, resulting in further possibilities of variations for controlling the drive speed in accordance with predetermined requirements. A particularly important field of application of the example just indicated is in connection with automatic machine tools; for example, the casing may in such a case constitute the carrier of a lathe or may be fixedly connected therewith.

The embodiment of Fig. 4 may also be modified by providing the lever 12 with a dead-point switching device. Such a device may be made so that the lever, upon touching the stop 13, jumps from the position α=0 to the position α' at which it hits another stop; the result will accordingly be a reciprocating drive (pendulum drive) which is controlled by two limit stops. The corresponding drive device may be advantageously used, for example, in connection with flat frame knitting machines. The working width of such a machine may be adjusted by adjusting the stops and the knitting speed may be adjusted as desired by altering the angular lever position. The corresponding adjustments may be automatically controlled by suitable means.

Figure 5:
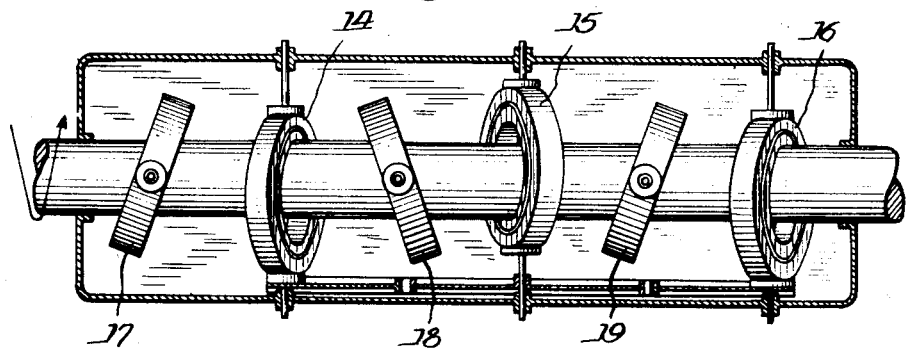
Fig. 5 represents in perspective view the scheme of construction of a drive gear comprising six ringlike rotation members.

In accordance with another object and feature of the invention, further rings may be provided for coaction with the same shaft—advantageously in units of three sets of symmetrically disposed rings as shown in Fig. 3—so as to increase efficiency. A suitable arrangement is shown in Fig. 5 comprising two sets of groups each comprising three rings coacting with one shaft. In order to distribute the contact pressures as uniformly as possible with respect to the shaft, the rings 14, 15, 16 of one group are arranged in keyed interlaced sequence with the rings 17, 18, 19 of the other group and the tilting axes of the two groups are displaced by 90°. The arrangement produces saving of space and great shifting thrust force. The tilting axes of each group are operatively connected together, for example, according to Fig. 3, so that the rings always form exactly the same tilting angle with the shaft axis. It will suffice in some circumstances to provide for each group only one pressure spring as described with reference to Fig. 3.

The embodiment according to Fig. 5 shows that the directions of the tilting axes of the rings, which suitably extend through the respective touching points with the shaft, that is, radially of the shaft, need not be mutually in parallelism. It will however be suitable in many cases to arrange these axes in parallel at least as to groups. If the direction of the tilting axis is however placed outside of the corresponding touching point, the result will be that the shift thrust forces operate upon the tilting axis with a rotary moment, and such arrangement may be utilized in the solution of special control problems.

The control of the gear drive device according to the invention, by alteration of the tilting axes of the rotation members may be effected manually or by means of suitable electric, hydraulic, pneumatic or other suitable known means. In some circumstances, the control may be derived from the rotating shaft through the medium of a suitable gear or an equivalent electrical remote control employing known means.

Further examples of embodiments for some particularly important purposes will now be briefly described. The leading thought that is to be kept mind is that the gear according to the invention may be considered as operating in the nature of a lead or drive screw with variable positive or negative pitch and that it may accordingly be advantageously used in all circumstances in which lead or drive screws are customarily employed and, especially in situations in which efficiency, easy adjustability, freedom from play, easy coupling and reliable power transmission, long life and relatively little wear are desired. The drive gear according to the invention is with regard to the mentioned desiderata superior to a lead or drive screw or spindle because the shifting operation of the lead screw is substituted by a rolling action.

Figure 6:
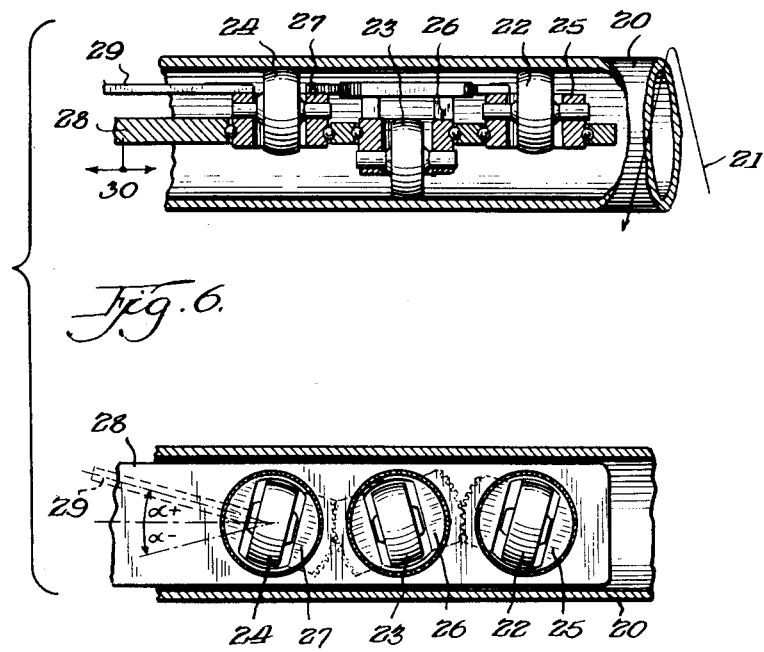
Fig. 6 shows an example of a kinematic variant of the invention.

Fig. 6 shows in schematic representation an embodiment of a kinematic variant of the gear drive of the invention, employing a hollow shaft and a rotation body in the form of a roller disposed therein, the inner diameter of the hollow shaft exceeding the outer diameter of the roller and being in frictional engagement therewith. Numeral 20 indicates the hollow shaft which is rotated in the direction of the arrow 21; numerals 22, 23, 24 indicate three spherical rollers in engagement with the inner wall of the hollow shaft at symmetric points thereof, the axes of the rollers being respectively journalled in members 25, 26, 27, and these members being in turn rotatably journalled in a carrier 28. Link means 29 is provided for adjusting the axes of the rollers 23, 24 about the angles +α or −α, thereby moving the carrier 28 to the right or to the left in the sense of the arrow 30, such operation being analogous to the one described in connection with Fig. 3.

Fig. 7 shows the use of the invention in connection with a machine tool, for example for the drive of the carrier of a lathe. Numeral 7 indicates, analogous to Fig. 3 a casing containing three friction rings arranged upon a shaft 8 which is driven by a gear 31. Upon the casing 7 is arranged the lathe carrier 32 carrying a tool, for example, a cutter 33 which is to be moved in the direction of the arrow 34. The direction and the speed of the motion are adjustable by means of a crank 35 which determines the angular position of the friction rings relative to the shaft 8.

For other purposes, for example, grinding operations, there are provided stops 36, 37 which are adjustable on the lathe bed, such stops cooperating, as described in connection with Fig. 4, with a lever 12 to produce a reciprocating motion of the casing 7 and the carrier 32.

Tool as well as work pieces may be analogously moved longitudinally as well as transversally in different machine tools; it is among others possible to effect three-dimensional motion of tables or carriers in simple milling and grinding machines. The guide or adjustment of the motion operation may be effected manually, by means of adjusting screws, stops, cams, link quadrants and the like.

The drive according to the invention has as compared with known motion mechanisms the advantage that it does not require any speed change gears. The shift adjustment can be effected during the working operation and quick return of a tool to normal position is possible; in the case of a dulling tool or in the event of deep cutting, overload can accordingly be guarded against by direct power transmission.

The feeler lever 12 may among others be used for the scanning of templets in copying operations.

In accordance with another object and feature of the invention, the casing containing the friction ring system may be fixedly disposed and the rolling motion relative to a shaft may be utilized for moving a tool. Such an embodiment utilizes the fact that the shaft and the friction rings are in mutual equilibrium. Responsive to angular adjustment of the friction rollers, the shaft will be moved in one or the other direction.

Fig. 8 shows by way of example a drill press based on the principle noted in the preceding paragraph. Numeral 7 again indicates a casing containing the friction ring system. The casing is in this case fixedly arranged on the upright 40. The shaft 8 carrying a drill 43 is driven by a motor 41 through the medium of a belt 42. The friction rings are angularly adjusted by means of a lever 44, thereby controlling the advance of the shaft 8 and the drill 43.

Spindles in the case of lathes multi-drill-drill presses and milling machines may be controlled in similar manner. The drive of a rolling cutter milling machine can be made particularly simple and the axial cutter advance may be eliminated by journalling the work piece spindle in accordance with the structure described with reference to Fig. 8.

The features explained above may be advantageously employed in other machine tools based primarily upon rectilinear motions, for example, in filing machines, screw cutters, saws and the like. Planers requiring slow advance and quick return or work piece advance in the case of turret lathes are other examples. Left or right hand rotation may be effected by exerting axial pressure in tools such as screwdrivers using the invention.

Forces may be developed, by the use of a greater number of friction rings embracing a shaft or of rollers disposed within a hollow shaft, so great, that the drive gear according to the invention may be employed, for example, in place of hydraulic gears and also for driving high speed planers and typewriters.

In accordance with a further object and feature of the invention, the shaft or the hollow shaft, need not be straight but may curve in predetermined manner or may be made so as to bend in a desired manner. The corresponding device will then be adapted for use in machines or apparatus for producing motions other than rectilinear.

The device according to the invention may be made as a follower to produce motions which can be automatically controlled, thus resulting in the possibility to place in working position tools or other elements, for example, paper staples for printing machines or duplicating machines. Another possibility of use resides in the control of lifting motions in the case of rams, drop hammers and the like or timed supply of tools, materials or work pieces for assembly lines and the like.

Other fields of application include machines such as packing machines in which materials are to be moved by gripping motions; meat and bread cutting machines; paper cutters; brick presses and associated apparatus; dividers and binders in sausage making or meat processing machines, microtomes and the like; in textile machines and wire-winding machines, for example, for guiding the thread in simple and in precision winding machines with flanged and cylindrical spools; for the control of expanding or stretching operations; and further for play-free and ready adjustment of measuring apparatus, various instruments, magnifying apparatus, slide projectors; and in sorting machines.

Fig. 9 shows as an example of the use of the device in connection with a microscope. The tube 45, similarly as the shaft 8 of the preceding examples, is journalled in three friction rings 46, 47, 48. The angle of inclination of these friction rings is fixed by fixedly arranging the corresponding ball bearings in the stand 49. The tube 45 may be readily adjusted as to height without play by rotating the uppermost ring 46 by means of the extension 50.

Among other possibilities of use of the invention are steering control in heavy motor vehicles; the closing and opening of curtains; motor controlled sliding and turning doors; and remote control of gates. The drive gear according to the invention may also be used in ships and vehicles by causing displacement of the center of gravity or alterations in centrifugal force to affect the drive gear so as to produce shifting of the corresponding components. In using the invention in connection with a scale provided with a beam having a shiftable counterweight, the beam branching off from the center may be employed for adjusting the friction bodies of the gear device so as to cause shifting of the counterweight to obtain balance of the beam.

Fig. 10 shows an example of the use of the invention in connection with a mathematical device. Numeral 7 again indicates the casing for the friction bodies, supporting the stylus arm 51 carrying a suitable stylus for recording upon a record sheet 52 the product of the tangent of the tilting angle $\beta$ of the friction rings with the sum of revolution $\omega$ of the shaft 8. The recording proportion factor $k$ depends upon the diameter $r$ of the shaft 8. The corresponding device may be used as a multiplier, an integrator, a planimeter, a quantity measuring instrument, a recorder, in which an angle is converted into a linear value, or as a pantograph and the like.

Additional fields of applications will be found in scanning guides for measuring instruments and apparatus; in the recording or transmission of lines, surfaces, spaces or bodies. The motion can thereby be effected continuously or intermittently, preferably line-for-line, as for example required in facsimile transmission, in copying processes and in the evaluation of X-ray pictures and the like. The gear drive according to the invention may also be used for continuous regulation of carbon electrodes in the case of arc lamps and analogously for the advance in accordance with sound values of sound record cutting machines.

Fig. 11 shows as a further example a piston drive in which the usual piston rod is substituted by a gear drive according to the invention. Numerals 53 and 54 indicate two piston machines having pistons formed by the ends of the shaft 8. The illustrated arrangement is intended for a pump in which the capacity can be adjusted by angular setting of the friction rings. A combustion motor may be constructed analogously, having pistons journalled in friction rings, such, that the motor is caused to operate responsive to the suction stroke.

Figs. 12 and 12a illustrate a carriage drive for an office machine and Fig. 12b shows schematically in sectional view a typewriter carriage 55 which is not as usually journalled upon two guide rails but upon a single guide rail 56, resting on the other, left side upon the friction ring system 7 cooperating with a drive shaft 8. The adjustment is effective in similar manner as in the examples described before, by link means 57 and a lever 58. A stop 59 is provided for braking the motion of the carriage, a spring 60 providing a cushioning effect. The direction of motion is indicated by the arrow V.

It may be mentioned in conclusion that, as a matter of principle, a hollow shaft provided with interiorly disposed friction rollers in accordance with Fig. 6 may be used in the illustrated embodiments.

Although specific embodiments of the invention have been illustrated and described, it will be understood that various changes may be made within the scope of the appended claims without departing from the spirit of the invention.

I claim:

1. A frictional drive gear embodying translatory and rotary motions, comprising a plurality of frictionally connected rotatable members, one of which is relatively long in its axial direction and another relatively short in its axial direction, said members having their contacting surfaces formed on different radii of generation, with the member of larger radius being annularly shaped in transverse cross section, means for supporting the member of shorter axial length for rotation about its axis and for pivotal movement about an axis extending normal to and intersecting such rotational axis and the rotation axis of the other member so that the external surface of the member of smaller radius frictionally engages the internal surface of the member of larger radius at a single region of contact which is intersected by said pivotal axis, rotation of said members about their respective axes being operative to effect translatory movement therebetween at a rate corresponding to the angular relation of the rotational axes of said members relative to said pivotal axis, and means for effecting adjustment of the axis of said member of shorter axial length about said pivotal axis for the control of said translatory movement.

2. A drive gear as defined in claim 1, wherein said member of greater length is a shaft member, and said relatively short member is annularly shaped in cross section, said shaft member extending through said annular member with the axis of the shaft member disposed eccentric with respect to the axis of said shaft member, the external surface of the latter frictionally engaging the internal surface of the annular member.

3. A drive gear as defined in claim 1, wherein the frictional engaging surface of said member of shorter axial length is arcuate in axially extending cross section.

4. A drive gear as defined in claim 1, wherein a plurality of members of relatively short axial length are provided, said members being symmetrically disposed with respect to the member of relatively long axial length whereby engaging pressures between the latter and the members of relatively short axial length are balanced about the axis of the longer member.

5. A drive gear as defined in claim 1, wherein a plurality of members of relatively short axial length are disposed about the axis of said members of relatively long axial length and form a journal for the latter.

6. A drive gear as defined in claim 1, wherein a plurality of members of relatively short axial length are provided, the pivotal axes of which extend in parallel relation, and means connecting said last mentioned members operative to maintain the rotational axes thereof in corresponding relationship relative to the rotational axis of said member of relatively long axial length.

7. A drive gear as defined in claim 1, wherein resilient means acting on said member of relatively short axial length in the direction of their respective pivotal axes is operative to urge such member into frictional engagement with said member of relatively long axial length.

8. A drive gear according to claim 1, wherein said member of greater length is a hollow shaft, a roller member constituting said relatively short member, the outer diameter of said relatively short member being less than the inner diameter of said hollow shaft, the axis of said roller member being eccentric to the axis of said hollow shaft member to produce frictional engagement therewith along a defined region thereof for effecting said translatory motion.

9. A drive gear according to claim 1, comprising a plurality of groups of embracing rotation members, each group comprising several rotation members, the tilting axes of the rotation members of each group extending in parallel but inclined with respect to the tilting axes of the rotation members of another group for effecting said translatory motion.

10. A drive gear according to claim 9, wherein the directions of the tilting axes of said groups of embracing rotation members are distributed symmetrically relative to said shaft member for effecting said translatory motion.

11. A drive gear according to claim 10, wherein the embracing rotation members of said groups are disposed in interlaced relationship for effecting said translatory motion.

12. A drive gear according to claim 1, wherein said relatively short member comprises a plurality of groups of embracing rotation members, each group comprising several embracing rotation members, wherein some of said embracing rotation members engage said member of greater length along an identical line embracing with the axis of the member of greater length an identical angle for effecting said translatory motion, and others of said embracing rotation members engage said member of greater length along a diametrically oppositely extending line embracing a mirrored angle with the axis of the member of greater length for effecting said translatory motion.

13. A drive gear according to claim 12, comprising means for operatively interconnecting said embracing rotation members for effecting said translatory motion.

14. A drive gear according to claim 6, comprising a lever for adjusting the tilt of said plurality of members of relatively short axial length in common, and control means for switching said lever to adjust it for opposite motion of said drive gear.

15. A drive gear according to claim 14, comprising a pair of control members for cooperating with said lever to cause said drive gear to execute reciprocating motion.

16. A drive gear according to claim 6, comprising lever means for adjusting the tilt of said plurality of members of relatively short axial length in common, and a deadpoint switching device cooperating with said lever means for controlling the operation thereof.

17. A drive gear according to claim 6, comprising lever means for adjusting the tilt of said plurality of members of relatively short axial length in common, and adjustable stop means cooperating with said lever means to cause said drive gear to operate as a follower gear.

18. A drive gear according to claim 6, comprising lever means for adjusting the tilt of said plurality of members of relatively short axial length in common, and means for controlling the operation of said lever means in accordance with variable functions of a curve.

19. A drive gear according to claim 1, wherein at least part of said member of greater length constitutes a piston of a piston machine.

20. A drive gear according to claim 1, wherein said member of greater length is the drive shaft of a lathe carriage.

21. A drive gear according to claim 1, wherein said member of greater length is the spindle shaft of a drill press.

22. A drive gear according to claim 1, wherein said member of greater length is a tube of a microscope.

23. A drive gear according to claim 1, wherein said member of greater length is operatively connected to a stylus arm of a mathematical device through said drive gear.

References Cited in the file of this patent

UNITED STATES PATENTS

| | | |
|---|---|---|
| 2,204,638 | Weathers | June 18, 1940 |
| 2,234,274 | Prinz | Mar. 11, 1941 |
| 2,653,595 | Higgins | Sept. 29, 1953 |